Figure 1:
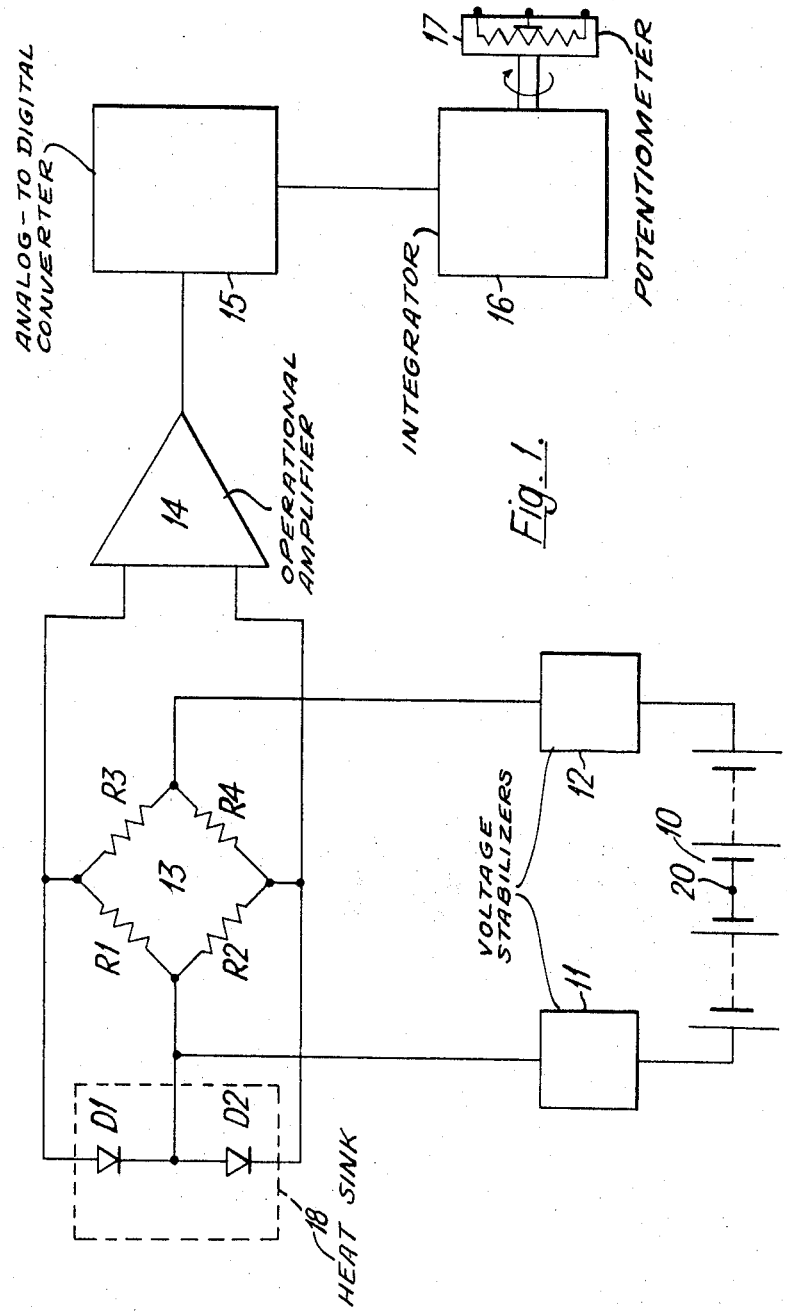

United States Patent

[11] 3,569,717

| [72] | Inventors | Oluyinka A. Awojobi;<br>Paul M. Dunachie, Glasgow, Scotland |
|---|---|---|
| [21] | Appl. No. | 866,278 |
| [22] | Filed | Oct. 14, 1969 |
| [45] | Patented | Mar. 9, 1971 |
| [73] | Assignee | D-Mac Limited |
| [32] | Priority | Nov. 7, 1968 |
| [33] | | Great Britain |
| [31] | | 52,754/68 |

[54] RADIATION MEASURING AND INTEGRATING DEVICE
7 Claims, 2 Drawing Figs.

[52] U.S. Cl. ............................................. 250/209,
250/210, 356/222
[51] Int. Cl. ............................................. H01j 39/12,
G01j 1/42
[50] Field of Search ............................................. 250/209,
210, 206; 356/222

[56] References Cited
UNITED STATES PATENTS

| 3,327,116 | 6/1967 | Loveday ..................... | 250/209x |
| 3,329,822 | 7/1967 | Rogers ....................... | 250/209 |

Primary Examiner—James W. Lawrence
Assistant Examiner—T.N. Grigsby
Attorney—Mason, Fenwick & Lawrence ABSTRACT: A radiation measuring device applicable to the measurement of direct radiation incident over a time interval and particularly applicable to the measurement of the net radiation, e.g. solar radiation, absorbed by a surface over a time interval. In the latter application, radiation sensitive devices are exposed to direct radiation and radiation reflected from the surface, respectively. A bridge circuit becomes unbalanced and supplies a signal to an analogue-digital converter. The output of the converter is integrated in an integrator to give a signal proportional to the net radiation absorbed over the time interval.

Fig. 1.

RADIATION MEASURING AND INTEGRATING DEVICE

This invention relates to a radiation measuring device and more particularly to a device for giving an output signal proportional to the value of radiation incident over a time interval.

The device of the invention is primarily intended for use with recording systems such as disclosed in U.K. Pat. Nos. 1,083,897 and 1,096,272, which are battery powered and are intended to operate unattended over a period of months. The system involves the recording at predetermined intervals of digital signals derived from an analogue signal from a transducer or measuring instrument. The recorded data may be subsequently analyzed.

Such recording systems permitting, as they do the acquisition of data over wide areas thus improving the assessment criteria available, are particularly suitable for hydrometereological measurement. However, for hydrometereological measurement reliable indication of solar radiation, or more accurately a reading of net radiation, is of critical importance in the study of evaporation rates.

The present invention is a radiation indicating device including a bridge circuit connected with, and to be energized through, a voltage stabilizing circuit, a radiation sensitive element being connected on one arm of the bridge, an analogue-digital converter connected to the output of the bridge circuit and an integrator connected with the output of the analogue-digital converter, whereby on exposure of the radiation sensitive element to radiation the bridge circuit becomes unbalanced and a signal proportional to the radiation incident over a time interval is obtained at the output of the integrator.

Figure 2:
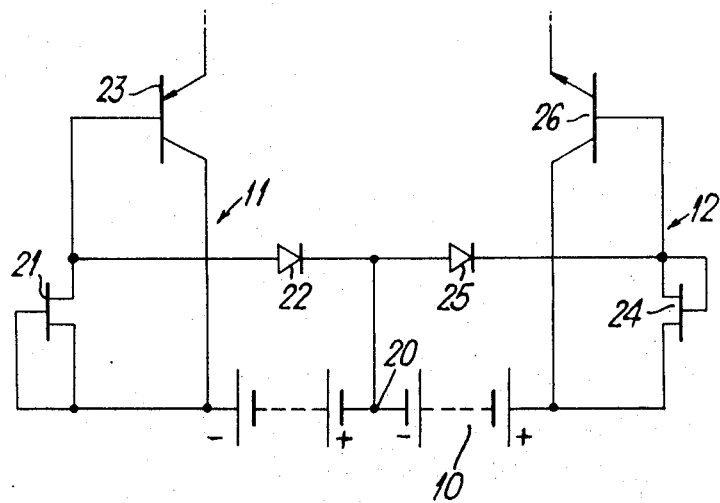

An embodiment of the present invention will now be described, by way of example, with reference to the accompanying drawings in which:

FIG. 1 is a partial schematic partial circuit diagram of a device for indicating the net solar radiation absorbed by the ground over a given time interval; and FIG. 2 is a circuit diagram of the voltage stabilizer circuits of FIG. 1.

Referring now to FIG. 1, a device for indicating solar radiation is connectable with a battery source 10 which may also be used to supply a recording system.

The device includes voltage stabilizing circuits 11 and 12 supplying a Wheatstone bridge 13 having two identical diodes $D_1$ and $D_2$ connected back to back across arms $R_1$ and $R_2$ of the bridge. The output of the bridge is connected to an operational amplifier 14 which supplies an analogue-digital converter 15, the output of which is connected with an integrator 16. The output of the integrator 16 drives the wiper of a potentiometer 17.

The diodes $D_1$ and $D_2$ are silicon which allows a sensibly linear characteristic over a wide range of ambient temperature conditions. They are mounted back to back on a common heat sink 18 which eliminates variation in junction temperature due to ambient variations.

The diodes are disposed just above ground level with one diode exposed to direct solar radiation and the other shielded from direct solar radiation but exposed to solar radiation reflected from the ground. The difference in the quantity of radiation impinging on the diodes is the net solar radiation absorbed by the ground. This difference gives rise to a difference in diode resistance causing the bridge 13 to become unbalanced. Unbalance of the bridge 13 is detected by the operational amplifier 14, the input of which is offset to ensure an output of the correct sign even when the major transition in intensity levels occurs during darkness.

The output of the operational amplifier 14 which is proportional to the net solar radiation absorbed by the ground, supplies the analogue-digital converter 15. The analogue-digital converter 15 is in the form of a voltage frequency converter the output of which is a train of pulses having a recurrence frequency which varies as a linear function of the input voltage and therefore as a linear function of the net absorbed radiation. This system has a low duty cycle, and hence the mean power requirement is also low.

The pulses from the analogue-digital converter 15 are supplied to the integrator 16. In this embodiment, the integrator 16 takes the form of an impulse motor stepping at the pulse recurrence frequency, the output of which is a shaft rotation proportional to the pulse count. The output shaft is coupled to the wiper of a potentiometer 17 which gives a voltage proportional to the number of pulses supplied over the relevant time interval. The voltage is therefore proportional to the net solar radiation absorbed during this time interval.

When the device is used with recording systems such as disclosed in U.K. Pat. Nos. 1,083,899 and 1,096,272, the voltage obtained on the potentiometer is tapped at predetermined time intervals to give recorded signals each of which represents the net solar radiation absorbed in a corresponding time interval.

The voltage stabilizers 11 and 12 shown in detail in FIG. 2 are similar in construction, with voltage stabilizer 11 supplied from the negative terminal and a center terminal 20 of the battery 10, and with voltage stabilizer 12 supplied from the positive terminal and the center terminal 20 of the battery 10. The voltage stabilizer 11 comprises a field effect transistor 21 series connected with a zener diode 22, the series connection being supplied by the battery 10. The constant current characteristic of the field effect transistor 22 maintains a constant current through the zener diode 22 which consequently maintains a constant voltage. A PNP transistor 23 has its base connected to the negative side of the zener diode 22, its collector connected to the negative terminal of the battery 10 and its emitter connected to one side of the bridge 13.

At the low current values at which the device is used the base-emitter voltage is constant and since the base voltage is held constant the emitter voltage is constant thus establishing a stabilized negative voltage at one side of the bridge 13.

The voltage stabilizer 12 used a field effect transistor 24, a Zener diode 25 and an NPN transistor 26. The operation of the voltage stabilizer 12 is similar to that of the voltage stabilizer 11 but providing a stabilized positive voltage.

We claim:

1. A radiation indicating device including a bridge circuit connected with, and to be energized through, a voltage stabilizing circuit, a radiation sensitive element being connected in one arm of the bridge, an analogue-digital converter connected to the output of the bridge circuit and an integrator connected with the output of the analogue-digital converter, whereby on exposure of the radiation sensitive element to radiation the bridge circuit becomes unbalanced and a signal proportional to the radiation incident over a time interval is obtained at the output of the integrator.

2. A radiation indicating device as claimed in claim 1, in which the radiation sensitive device is a silicon diode.

3. A radiation indicating device as claimed in claim 1, in which a second radiation sensitive device is connected in the other arm of the bridge, whereby two intensities of radiation may be compared.

4. A radiation indicating device as claimed in claim 3, in which the radiation sensitive devices are silicon diodes mounted back to back on a common heat sink, whereby the device may be used to indicate the net absorbed radiation of a surface by exposing one diode to direct solar radiation and the other diode to solar radiation reflected from the surface.

5. A radiation indicating device as claimed in claim 1, including an operational amplifier, the input of which is connected with the output of the bridge and the output of which is connected with the input of the analogue-digital converter.

6. A radiation indicating device as claimed in claim 1, in which the analogue-digital converter is in the form of a voltage-frequency converter, supplying output pulses of a frequency proportional to the input voltage.

7. A radiation indicating device as claimed in claim 1, in which the integrator is an impulse motor stepping at the frequency of the output pulses.